United States Patent
Choi et al.

(10) Patent No.: US 9,229,287 B2
(45) Date of Patent: Jan. 5, 2016

(54) ARRAY SUBSTRATE, MANUFACTURING METHOD AND DISPLAY DEVICE THEREOF

(71) Applicant: BOE Technology Group Co., Ltd., Beijing (CN)

(72) Inventors: Hyun Sic Choi, Beijing (CN); Jung Mok Jun, Beijing (CN)

(73) Assignee: BOE TECHNOLOGY GROUP CO., Ltd., Beijing (CN)

( * ) Notice: Subject to any disclaimer, the term of this patent is extended or adjusted under 35 U.S.C. 154(b) by 0 days.

(21) Appl. No.: 14/016,583

(22) Filed: Sep. 3, 2013

(65) Prior Publication Data

US 2014/0061691 A1  Mar. 6, 2014

(30) Foreign Application Priority Data

Sep. 3, 2012  (CN) .................. 2012 2 0445578 U

(51) Int. Cl.
 *H01L 29/205* (2006.01)
 *G02F 1/1362* (2006.01)
 *G02F 1/1343* (2006.01)
 *G02F 1/1335* (2006.01)

(52) U.S. Cl.
 CPC .... *G02F 1/136227* (2013.01); *G02F 1/134309* (2013.01); *G02F 1/136286* (2013.01); *G02F 1/133512* (2013.01); *G02F 2001/134318* (2013.01); *G02F 2001/134381* (2013.01); *G02F 2201/40* (2013.01)

(58) Field of Classification Search
 CPC ............... H01L 27/124; H01L 29/4908; H01L 27/1251; H01L 27/153; H01L 27/3258
 USPC .......................................................... 257/91
 See application file for complete search history.

(56) References Cited

U.S. PATENT DOCUMENTS

2012/0050643 A1* 3/2012 Li et al. ..................... 349/61

OTHER PUBLICATIONS

Extended European search report issued by the European Patent Office on Dec. 17, 2013, 7 pages.

* cited by examiner

*Primary Examiner* — Thanh T Nguyen

(57) ABSTRACT

The invention provides an array substrate, a manufacturing method and a display device thereof. The array substrate comprises a substrate, a gate line and a pixel electrode disposed on the substrate, a common electrode disposed above and overlaying the gate line, wherein a strip-shaped through hole is disposed on the common electrode and at least a portion of the strip-shaped through hole is positioned right above the gate line.

6 Claims, 3 Drawing Sheets

ARRAY SUBSTRATE, MANUFACTURING METHOD AND DISPLAY DEVICE THEREOF

CROSS REFERENCE TO RELATED APPLICATIONS

This application claims priority from Chinese National Application No. 201220445578.4 filed on Sep. 3, 2012, the contents of which are incorporated herein by reference.

FIELD OF THE ART

Embodiments of the invention relate to the field of display fabrication technologies, more particularly, to an array substrate, a method for manufacturing the same, and a display device comprising the array substrate.

BACKGROUND

In an Advanced-Super Dimensional Switching (AD-SDS, also known as ADS) technology, a multi-dimensional electric field is formed with both a parallel electric field produced at edges of pixel electrodes on the same plane and a vertical electric field produced between a pixel electrode layer and a common electrode layer, so that liquid crystal molecules at all orientations, which are located directly above the electrodes and between the pixel electrodes in a liquid crystal cell, can be rotated and aligned, which enhances the work efficiency of planar-oriented liquid crystals and increases light transmittance. The Advanced-Super Dimensional Switching technology can improve the picture quality of TFT-LCDs and has advantages of high transmittance, wide viewing angles, high opening ratio, low chromatic aberration, low response time, no push Mura, etc.

The ADS technology optimizes the liquid crystal material by means of electrodynamics and achieves a light efficiency of 90 percent of negative liquid crystals for positive liquid crystals, thereby solving the problem of low response time caused by the large viscosity of negative liquid crystals. Moreover, the ADS technology provides notable improvements in light transmittance, contrast ratio, brightness, viewing angle, chromatic aberration and so on.

In an ADS-mode display device, a black matrix (BM) for shielding light leaked from gate line (the light leakage is resulted from the local defects, i.e. "disinclination", in alignment of liquid crystals) normally has a minimum width of 32 μm, such that light leakage of the gate line is reduced to the maximum extent while a relatively optimal aperture ratio for the pixel element may be obtained. Moreover, the aperture ratio is an important factor in determining the brightness and the power consumption of the display device—the higher the aperture ratio is, the higher the light transmittance is, therefore the brighter the screen will be, under the same backlight condition. Meanwhile, the power consumption of the backlight source in the LCD display takes up about 60% of the whole power output, therefore, a design with an aperture ratio as high as possible should be employed provided that the process conditions can be met, such that the power consumption of the backlight source may be minimized while the brightness requirement of the display device is met, thereby lowering the power consumption of the whole display system. However, in the ADS-mode display device, it needs to reduce the width of the BMs in order to improve the aperture ratio of the pixel element, which will lead to and exaggerate light leakage of the gate line.

An I-ADS mode display device with high transmittance is proposed for the purpose of improving the aperture ratio of the pixel element while reducing light leakage of the gate line. The difference between the I-ADS mode and ADS mode display devices lies in that the positions of the pixel electrode and the common electrode in the array substrate are inverted. That is, in the I-ADS mode array substrate, the array substrate is disposed as the first electrode (first ITO, that is the plate-like electrode) on the substrate and the common electrode is disposed as the second electrode (second ITO, that is a slit electrode) above the pixel electrode; while in the ADS mode array substrate, the common electrode is disposed as the first electrode on the substrate, and the pixel electrode is disposed as the second electrode above the common electrode.

FIG. 1(a) schematically illustrates a configuration of a conventional I-ADS mode array substrate and FIG. 1(b) is a cross section taken along A-A' of FIG. 1(a). As illustrated in FIG. 1(b), the I-ADS mode array substrate comprises a substrate 104, a gate line 103 and a pixel electrode 101 disposed on the substrate 104, and a common electrode 102 disposed above and completely overlaying the gate line 103. Here, common electrode shielding effect is generated due to the common electrode 102 completely overlays the gate line 103, such that light leakage of the gate line is minimized, therefore the width of the BM for shielding light leaked from the gate line may be reduced, which helps to improve the aperture ratio of the pixel element. However, it is the common electrode completely overlaying the gate line that causes ratio of the gate electrode capacitance (C_gate) to increase and the line load of the gate line to increase, thereby causing a gate line delay and affecting the charge rate and charge efficiency of the display device.

SUMMARY

Embodiments of the invention provide an array substrate that can decrease the gate line load while improving the aperture ratio of the pixel element, and a display device comprising the array substrate.

A first aspect of the invention provides an array substrate comprising a substrate, a gate line and a pixel electrode disposed on the substrate, and a common electrode disposed above and overlaying the gate line, wherein a strip-shaped through hole is disposed on the common electrode and at least a portion of the strip-shaped through hole is positioned right above the gate line.

As an example, all of the strip-shaped through hole is positioned right above the gate line.

As an example, a width of the strip-shaped through hole is larger than zero but smaller than a width of the gate line.

As an example, the width of the gate line is smaller than a width of the common electrode.

As an example, an insulating layer is disposed between the pixel electrode and the common electrode.

A second aspect of the invention provides a display device comprising the above array substrate.

A third aspect of the invention provides a method for manufacturing an array substrate comprising:

forming a gate electrode and a pixel electrode on a substrate;

forming a common electrode above the gate electrode, wherein the common electrode has a strip-shaped through hole and overlays the gate electrode, and at least a portion of the strip-shaped through hole being positioned right above the gate line.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

Numeral Reference:
101, 201-pixel electrode; 102, 202-common electrode; 103, 203-gate line; 104, 204-substrate; 105-data line.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1A:
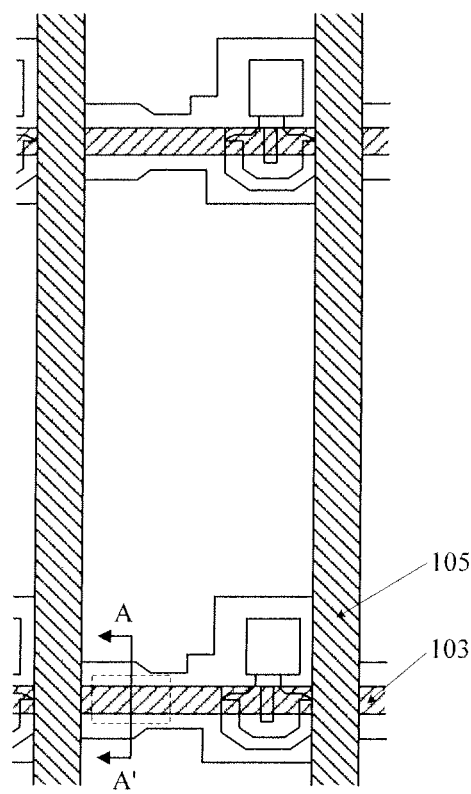
FIG. 1(a) schematically illustrates a configuration of a conventional array substrate with I-ADS mode.
Figure 1B:
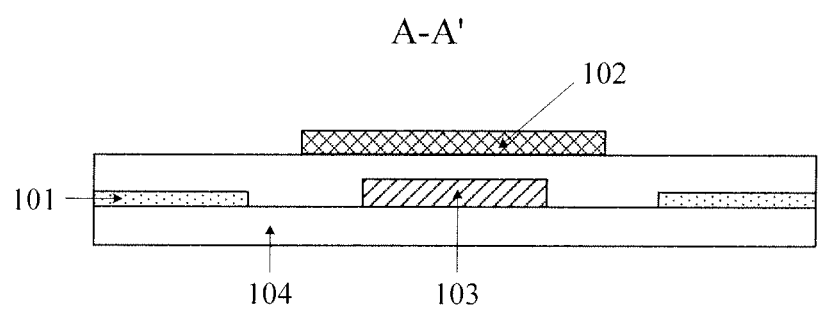
FIG. 1(b) is a cross section taken along A-A' of the array substrate of FIG. 1(a)
Figure 2:
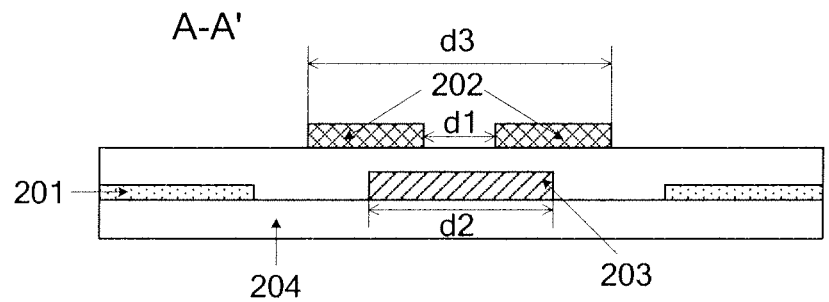
FIG. 2 schematically illustrates a configuration of an array substrate in accordance with an embodiment of the invention.

As illustrate in FIG. 2, an array substrate in accordance with an embodiment of the invention comprises a substrate 204, a gate line 203 and a pixel electrode 201 disposed on the substrate 204, a common electrode 202 disposed above and overlaying the gate line 203. An insulating layer is disposed between the pixel electrode 201 and the common electrode 202. Naturally, the array substrate may further comprises a data line, a plurality of pixel elements (each of which comprises a TFT) defined by intersections of the data line and the gate line, and a common electrode line etc, all of which will not be described herein as they are irrelevant to the inventive array substrate.

Figure 4:
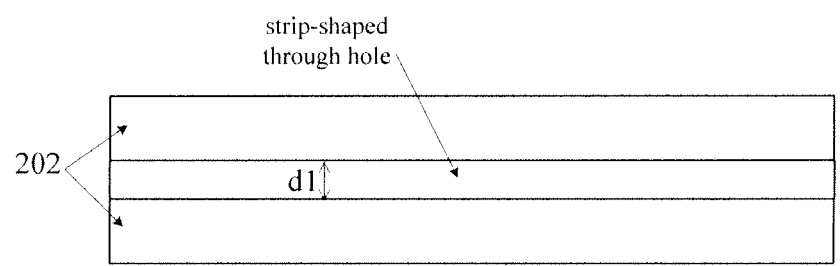
FIG. 4 schematically illustrates a configuration of a strip-shaped through hole in the array substrate in accordance with the embodiment of the invention.

As illustrated in FIG. 4, a strip-shaped through hole with a width dl is disposed on the common electrode 202; the strip-shaped through hole extends across the common electrode 202 along a direction parallel to the gate line 203 and is right above the gate line 203. In other embodiments, at least a portion of the strip-shaped through hole is positioned right above the gate line. Preferably, the width d1 of the strip-shaped through hole is larger than zero but smaller than a width d2 of the gate line 203. More preferably, the width d2 of the gate line 203 is smaller than a width d3 of the common electrode 202 on both sides of the strip-shaped through hole.

Figure 3:
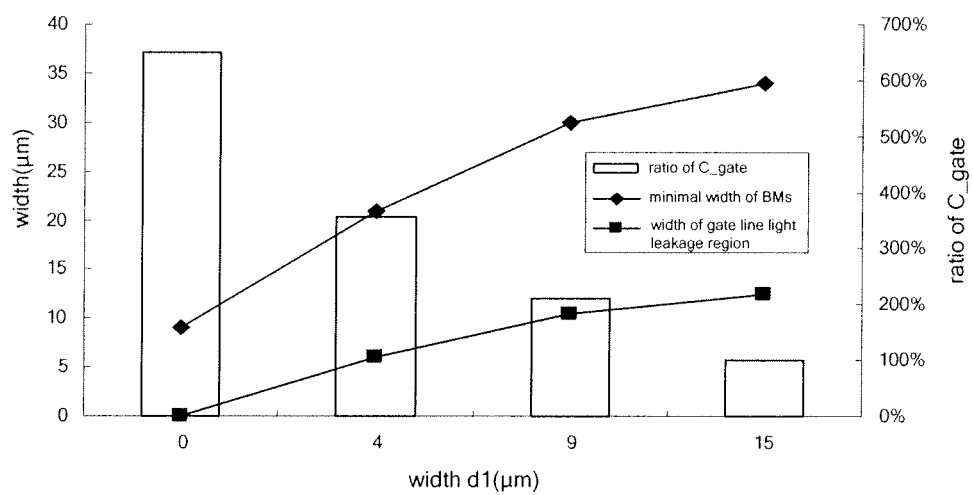
FIG. 3 is a graph schematically illustrating relationships between a width of a strip-shaped through hole disposed on a common electrode 102, a minimum width of a BM, a gate line light leakage region and ratio of C gate of the array substrate in accordance with the embodiment of the invention.

FIG. 3 is a graph schematically illustrates relationships between the width dl of the strip-shaped through hole disposed on the common electrode 202 and a minimum width of a BM for shielding light leaked from the gate line, a width of a gate line light leakage region (which is a light leakage region on a single side of the gate line, for example, a region between the gate line 203 and the pixel electrode 201 where an electric field is generated might be a light leakage region) and a ratio of C_gate, where the ratio of C_gate is a ratio between a gate electrode capacitance of the array substrate according to the invention and a gate electrode capacitance of a conventional ADS mode array substrate. It is seen that the minimum width of the BM and the width of the gate line light leakage region increase with the increasing of the width of the strip-shaped through hole, but the ratio of C_gate is decreased.

As illustrated in FIG. 3, when the width d1 of the strip-shaped through hole is zero (i.e., d1=0), there is no strip-shaped through hole formed on the common electrode 202. An array substrate with such a configuration is equivalent to the convention I-ADS mode array substrate, accordingly, the minimum width of the BM is about 9 µm, the width of the gate line light leakage region is 0, and the ratio of C_gate is about 620%. Although the minimum width of the BM in the conventional I-ADS mode array substrate is significantly reduced (by about 23 µm) in comparison with the minimum width (about 32 µm) of the BM in the conventional ADS-mode array substrate, a gate line load (the gate line load=gate electrode capacitance*gate electrode resistance) is increased by about 6.2 time in comparison with the gate line load of the conventional ADS-mode array substrate. As a result, the line load of the gate line becomes very large, which further increases the delay in both the gate line and the data line and severely affects the charge rate and charge efficiency of the display device.

When the width dl of the strip-shaped through hole is 4 µm (i.e., d1=4 µm), accordingly, the minimum width of the BM is about 24.5 µm, the width of the gate line light leakage region is about 6 µm, and the ratio of C_gate is about 350%. It is seen that with the strip-shaped through hole having a width of d1=4 µm the minimum width of the BM and the width of the gate line light leakage region are both increased in comparison with the minimum width of the BM and the width of the gate line light leakage region of the conventional I-ADS mode array substrate, but the ratio of C_gate is decreased by about 43.5% in comparison with the ratio of C_gate (i.e., the ratio of C gate of 620% when d1=0) the conventional I-ADS mode array substrate. As a result, the gate line load is effectively reduced and the delay in the gate line and the data line is decreased as well, thereby decreasing the influence on the charge rate and charge efficiency of the display device. For the strip-shaped through hole with the width d1=4 µm, the minimum width of the BM is decreased by about 7.5 µm in comparison with the conventional ADS-mode array substrate, therefore, the aperture ratio is increased by about 3% in comparison with the conventional ADS-mode array substrate, which greatly decreases the power consumption of the whole display system. In comparison with the conventional ADS-mode array substrate, although the array substrate of the invention increases the ratio of C_gate (by about 3.5 times) thereby causing increase in the gate line load, the aperture ratio is increased (by about 3%) as well and the power consumption of the whole display system is decreased. Moreover, the increase in the aperture ratio is more important to the whole display system than the increase in the ratio of C_gate, thus the increasing in the ratio of C_gate has a relatively small impact on the whole display system.

In comparison with the conventional ADS-mode array substrate, the array substrate according to the embodiment of the invention can reduce light leakage while making the width of the BM even smaller (a width of the gate line light leakage region in the conventional ADS mode is generally 10 to 15 µm) and not limited to that, thereby significantly increasing the aperture ratio of the pixel element.

In comparison with the conventional I-ADS mode array substrate, the array substrate according to the embodiment of the invention can reduce the gate electrode capacitance and the gate line load, thereby decreasing the delay in the gate line and the effect on the charge rate and charge efficiency of the display device.

An embodiment of the invention further provides an I-ADS mode display device comprising the above array substrate.

An example of the display device is a LCD, where the array substrate is disposed oppose to an opposed substrate to form a liquid crystal cell and liquid crystal material is filled in the cell. The opposed substrate is for example a color filter substrate. A pixel electrode of each pixel element of the array substrate is configured for applying an electric field to control rotations of the liquid crystal material and thus performing display operation. In some examples, the LCD may further comprise a backlight source providing backlight for the array substrate.

Another example of the display device is an organic light emitting device (OLED), where a laminated layer of organic light emitting materials is formed on the array substrate and an pixel electrode of each pixel element functions as an anode or a cathode to drive the light emitting material to emit, thereby performing display operation.

A further example of the display device is an E-paper display device, wherein an e-ink layer is formed on an array substrate, and a pixel electrode of each pixel element functions as a voltage applied for driving charged particles in the e-ink to move so as to perform a display operation.

An embodiment of the invention further provides a method for manufacturing the above array substrate, comprising:

forming a gate electrode and a pixel electrode on a substrate;

forming a common electrode above the gate electrode, wherein the common electrode has a strip-shaped through hole and overlays the gate electrode, and at least a portion of the strip-shaped through hole being positioned right above the gate line.

As an example, all of the strip-shaped through hole is positioned right above the gate line.

As an example, a width of the strip-shaped through hole is larger than zero but smaller than a width of the gate line.

As an example, the width of the gate line is smaller than a width of the common electrode.

As an example, the method may further comprise: forming an insulating layer overlaying the gate electrode and the pixel electrode after forming the gate electrode and the pixel electrode.

What are described above is related to the illustrative embodiments of the disclosure only and not limitative to the scope of the disclosure; the scopes of the disclosure are defined by the accompanying claims.

What is claimed is:

1. An array substrate, comprising:
a substrate;
a gate line and a pixel electrode both disposed on the substrate; and
a common electrode disposed above and overlaying the gate line;
wherein a strip-shaped through hole is disposed on the common electrode and extends to edges of the common electrode in an extending direction of the gate line, such that the strip-shaped through hole is aligned with the common electrode in a vertical direction and a the strip-shaped through hole is equal to a length of the common electrode, at least a portion of the strip-shaped through hole is positioned right above the gate line.

2. The array substrate of claim 1, wherein all of the strip-shaped through hole is positioned right above the gate line.

3. The array substrate of claim 1, wherein a width of the strip-shaped through hole is larger than zero but smaller than a width of the gate line.

4. The array substrate of claim 3, wherein the width of the gate line is smaller than a width of the common electrode.

5. The array substrate of claim 1, wherein an insulating layer is disposed between the pixel electrode and the common electrode.

6. A display device comprising the array substrate of claim 1.

* * * * *